United States Patent [19]

Lemor

[11] 3,726,151
[45] Apr. 10, 1973

[54] ADJUSTABLE SCREW AND NUT DEVICE

[75] Inventor: Pierre C. Lemor, Ville D'Avray, France

[73] Assignee: SKF Industrial Trading and Development Company, Amsterdam, Switzerland

[22] Filed: May 26, 1971

[21] Appl. No.: 147,017

[30] Foreign Application Priority Data

June 1, 1970 France..........................7019978

[52] U.S. Cl......74/424.8 A, 74/424.8 B, 74/424.8 C, 74/441
[51] Int. Cl. ............................F16h 1/18, F16h 55/18
[58] Field of Search..........................74/441, 424.8 C, 74/424.8 A, 424.8 B

[56] References Cited

UNITED STATES PATENTS

| | | | |
|---|---|---|---|
| 2,734,394 | 2/1956 | Chauvel | 74/441 |
| 3,214,991 | 11/1965 | Perrin | 74/424.8 C |

*Primary Examiner*—Leonard H. Gerin
*Attorney*—Howson and Howson

[57] ABSTRACT

This screw and nut device with precision play adjustment characteristic comprises two nuts engaging a commonscrew, for example through the medium of satellite rollers. These nuts are connected by a coupling ring engaging screw-threaded adjacent end portions of said nuts which have the same directions but slightly different pitches. The play is adjusted by rotating said ring after locking said nuts against rotation by means of a key clearing said ring. The desired adjustment is then maintained by replacing said key with another key adapted to lock said ring against rotation with respect to said nuts.

2 Claims, 5 Drawing Figures

PATENTED APR 10 1973　　3,726,151

INVENTOR:
PIERRE C. LEMOR
BY Howson & Howson
ATTYS.

ADJUSTABLE SCREW AND NUT DEVICE

FIELD OF THE INVENTION

The present invention relates to screw and nut devices, notably of the satellite or planet-roller or ball-circulation or roller-circulation type, with play adjustment means.

DESCRIPTION OF THE PRIOR ART

Devices of this character are well known, notably lead screws of machine-tools, wherein the play is adjusted by the relative displacement of a pair of nuts. In a first known device the two nuts are assembled by a coupling ring and means are also provided for mutually locking against rotation said nuts and the coupling ring, these means comprising notably intermeshing teeth rigid with the coupling ring on the one hand and with the ends of the two nuts co-acting therewith, on the other hand. In the case of the first known device mentioned hereinabove, the two nuts and the coupling rings are also locked against axial translation, the play being adjusted by producing a relative angular movement of the two nuts. Now, this last-mentioned operation requires of course the disengagement of one of the two nuts from the corresponding teeth of said coupling ring, and this constitutes a tedious, complicated and relatively long handling. On the other hand, the coupling ring comprising two slightly different sets of teeth requires a very accurate machining and therefore constitutes a very costly workpiece. Finally, the necessity of locking the two nuts against axial translation involves the use of an outer case also necessary for locking one of the two nuts against rotation. This case must also be machined internally with a high degree of precision and, therefore, constitutes likewise an expensive part requiring certain auxiliary mechanical members, so that the final cost of the device is further increase.

In another known device, the two nuts are slidably mounted in a fixed case so that they can move axially toward each other while exerting an adjustable pressure on the screw threads by means of an adjustable nut engaging a screw-threaded portion of said case. Since the case is an integral part of the machine, the play cannot be adjusted until the screw and the two nuts have been properly mounted in the case.

SUMMARY OF THE INVENTION

The device according to the present invention comprises likewise two nuts assembled by means of a coupling ring, means being provided for mutually locking said nuts and said ring against rotation; however, since the play is adjusted by causing a relative axial movement of the two nuts, instead of producing a relative rotation thereof, as in the first device mentioned hereinabove, the means for locking said nuts against rotation may be of considerably simpler and therefore more economical nature than in said previous device.

The screw and nut device according to the present invention is of the above-defined type and characterized in that the coupling ring co-acts with the two nuts through two internally screw-threaded portions of same pitch diameters and same directions but of slightly different pitches, and that the means contemplated for locking said coupling ring against rotation may be rendered inoperative to permit the adjustment of the necessary play by simply rotating said ring.

In fact, while in the first known device the play adjustment cannot be performed unless one of the two nuts is disengaged from the coupling ring, this step is not required for adjusting the play in the device according to this invention. In fact, in the present invention to perform the necessary adjustment it is only necessary to release the means preventing the rotation of said coupling ring and to rotate this ring through a suitable angle. The step necessary for performing this release and therefore the desired adjustment is particularly simple and rapid in the case of the preferred form of embodiment of this invention, wherein the means for locking said ring against rotation consist of a pair of keys to be used alternatively, one key engaging only aligned longitudinal grooves formed in the pair of nuts while clearing the coupling ring to permit the rotation thereof, the other key engaging not only the aligned nut grooves but also a corresponding groove formed in said coupling ring in order to lock same after the adjustment operation.

The screw and nut device according to the present invention is also characterized by the following advantageous features:

the coupling ring comprising only two internally screw-threaded portions having slightly different pitches is extremely simple and therefore, very cheap to manufacture, even if due account is taken of the high degree of precision with which these two screw-threaded portions are to be machined, and also of the matching screw-threaded portions of said nuts, in order to afford a very accurate play adjustment.

Moreover, the manufacture of the device according to this invention is simplified by the fact that it is free of any accurately machined teeth as required for example in the first prior are device mentioned hereinabove, and that only the screw-threaded portions may be machined with a high-degree of precision;

Furthermore, the device according to this invention does not comprise necessarily a case involving costly machining operations and complicated delicate extra parts, except a pair of simple, cheap keys;

Finally, the present device, in comparison with the second known device mentioned hereinabove, is advantageous in that it can be adjusted beforehand, i.e. before mounting the screw on the machine, since it does not require the presence of a fixed case rigid with the machine; in other words, the screw and nut devices constructed according to the teachings of this invention can be delivered in a fully adjusted condition to the machine-tool fitters, thus providing additional advantageous features as will readily occur to those skilled in the art.

An additional advantage resulting from this possibility of pre-adjusting the screw and nut device according to this invention is that the rigidity of the screw and nuts assembly can safely be increased, this feature being particularly valuable in the case of satellite or planet nuts or rollers, or when using a ball or roller circulation, with a view notably to improve the precision of machine-tools equipped with these devices.

BRIEF DESCRIPTION OF THE DRAWINGS

A typical form of embodiment of the screw and nut device, of the satellite- or planet-roller type, according to this invention, will now be described with reference to the attached drawing, in which.

DESCRIPTION OF THE PREFERRED EMBODIMENT

Figure 1:
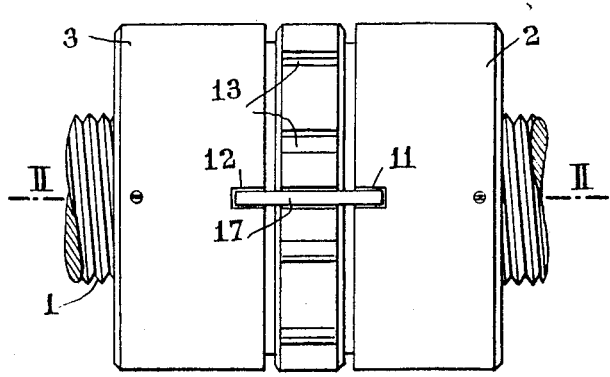
FIG. 1 illustrates the device in side elevational view.
Figure 2:
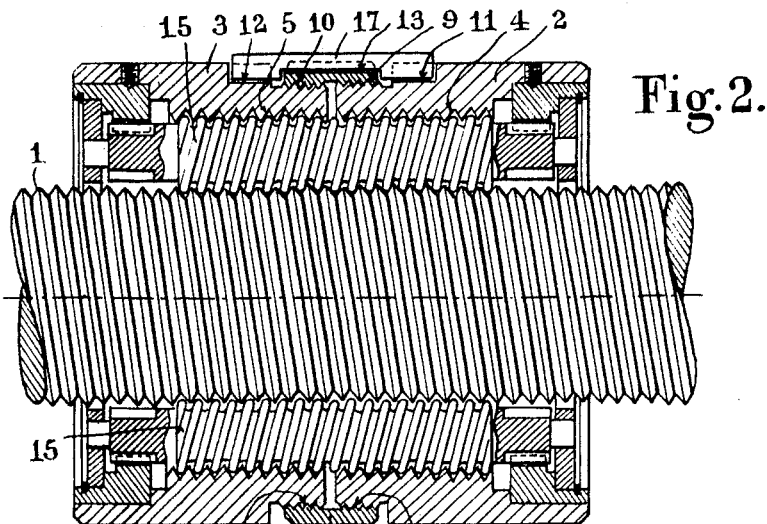
FIG. 2 is an axial sectional view of this device, the section being taken along the line II—II of FIG. 1.
Figure 3:
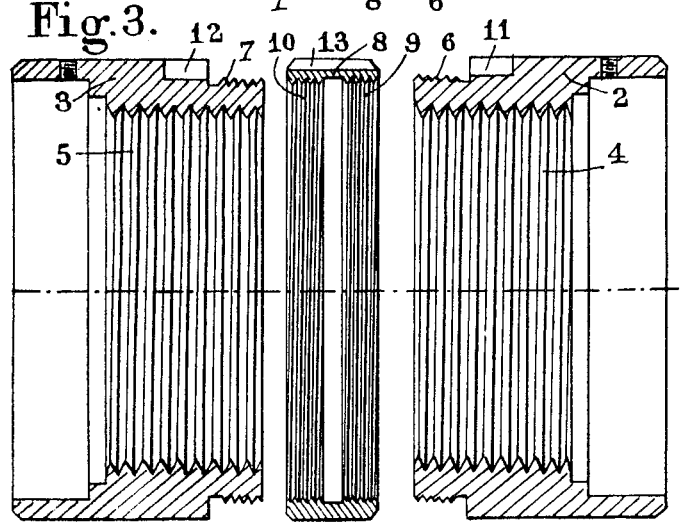
FIG. 3 illustrates in section taken along an axial plane the two nuts and the coupling ring of the device of FIG. 1, in positions relatively close to those obtained in the assembled condition.
Figure 4:
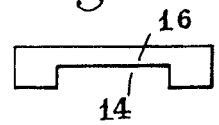
FIGS. 4 and 5 are elevational views showing two different types of keys to be used alternatively in the device of FIG. 1.
Figure 5:
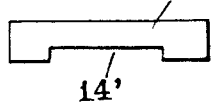

The form of embodiment illustrated comprises essentially a screw 1 on which a pair of nuts 2 and 3 of the same type and formed with the same internal screw-threads 4 and 5 (FIGS. 2 and 3) are engaged. In the typical structure illustrated, these two nuts 2 and 3 are mounted on the screw 1 in a manner known per se, i.e. through the medium of screw-threaded satellite- or planet-rollers 15 adapted to roll at the same time on the internal threads 4 and 5 of nuts 2 and 3, and on the screw-threads of screw 1; since these rollers are well known in this technical field, it is not deemed necessary to describe them in detail. The two registering or adjacent ends of nuts 2, 3 have a reduced outer diameter along a certain axial portion and these portions are formed with male screw threads 6, 7 respectively, having identical shapes, pitch diameters and direction; however, the pitches or these screw-threaded portions 6, 7 differ slightly; thus, in a typical form of embodiment the pitch of threads 6 is 1.05 mm and that of threads 7 of 1 mm. The registering or adjacent ends of nuts 2 and 3 are mutually coupled by means of a ring 8 having two internally threaded portions 9, 10 corresponding exactly the former 9 to the external threads 6 of nut 2 and the latter 10 to the external threads 7 of nut 3; as a result, of course, the two threaded portions 9, 10 of coupling ring 8 have likewise slightly different pitches. Each nut 2, 3 has formed in its outer peripheral wall, adjacent said screw-threaded portions 6, 7, a longitudinal groove 11, 12 having substantially the same dimensions in the two nuts 2 and 3. Furthermore, the outer peripheral surface of coupling ring has formed therein a number of longitudinal, regularly spaced grooves 13 of same width as the grooves 11, 12 of nuts 2 and 3, so that any one of said ring grooves 13 may be brought in alignment with said nut grooves 11, 12 to permit the fitting of a key of one or the other types shown in FIGS. 4 and 5, respectively. Assuming that the pair of nuts 2, 3 are screwed on the screw 1 by means of the set of satellite or planet rollers 15 as shown in FIG. 1, the registering ends of these nuts are interconnected by means of the coupling ring 8 of which the internally screw-threaded portions 9, 10 engage the externally screw-threaded portions 6 and 7 of said nuts, respectively; thus, the play can be adjusted as follows: firstly, the two grooves 11, 12 of said nuts are mutually aligned, then the ends of a key 16, of the type illustrated in FIG. 4, is inserted into these two aligned grooves; a key of this type comprises a central notch 14 of a depth sufficient to enable its central or bridge portion to clear the coupling ring 8 when the key ends are engaged in said nut grooves, so that the ring 8 can rotate freely, while the same key 16 locks said nuts 2, 3 against rotation. Thus, if under these conditions the coupling ring 8 is rotated, say, by one-tenth of a revolution in relation to said nuts, held against rotation, the relative axial movement of the two nuts will be one-tenth of the pitch difference between the threads 6, 9 on the one hand, 7, 10 on the other hand; in the case of the example given hereinabove, the relative axial movement of nuts 2, 3 will be 0.05/10 mm, i.e. 0.005 mm. Assuming that ten grooves 13 are formed at spaced intervals in coupling ring 8, and that grooves pertaining to the three parts 2, 3 and 8 are aligned before rotating said coupling ring, the next groove of this ring will also be aligned with the grooves 11 and 12 of nuts 2 and 3 after the aforesaid rotation, so that it will then be possible to introduce the second key 17, shown in FIG. 5, into the thus three aligned grooves 11, 12 and 13. Now this key 17 of the second type differs from the first key 16 (FIG. 4) only by the lesser depth of its inner central notch 14', so that the central or bridge portion of this key 17 will engage the aligned groove 13 of coupling ring 8, thus locking the three parts 2, 3 and 8 against rotation and positively preventing any subsequent, undesired modification of the play.

In the typical form of embodiment of the invention described hereinabove, the pair of nuts 2 and 3 of the satellite-roller type may also be replaced by ball-circulation or roller-circulation nuts, according to any one of the many known constructions, with or without means for causing the recirculation of the balls or rollers.

Of course, the specific form of embodiment illustrated and described herein should not be construed as limiting the scope of the invention since it is given by way of example, not of limitation, to which many modifications and variations may be brought without departing from the basic principle of the invention as set forth in the attached claims.

What I claim is:

1. A screw and nut device comprising a screw, a pair of nuts having identical screw threads and mounted coaxially on said screw in succession, the confronting ends of said nuts being formed with externally screw threaded portions of the same direction but slightly different pitches, a coupling ring having a pair of internally threaded portions complementary to said externally screw threaded portions of said nuts and rotatable relative thereto to adjust the axial spacing of said nuts relative to one another, means for locking said nuts against mutual rotation including aligned grooves in the outer periphery of said nuts adjacent and outboard of said externally screw threaded portions and locking key means engageable in the aligned grooves of said nuts, a plurality of circumferentially spaced longitudinal grooves in the outer periphery of said coupling ring adapted to be aligned with the grooves of said nut by rotating said coupling ring relative to said nuts, said locking key means consisting of a first key of a configuration to engage in the grooves of said nuts and coupling ring to thereby prevent relative rotation of the nuts and coupling ring and second key means of a configuration to engage in only the aligned grooves of said nuts thereby permitting rotation of the coupling ring relative to said nuts.

2. A device as set forth in claim 1, wherein rolling members are interposed between said screw and said pair of nuts.

* * * * *